United States Patent [19]

Priem et al.

[11] Patent Number: 4,956,801
[45] Date of Patent: Sep. 11, 1990

[54] MATRIX ARITHMETIC CIRCUIT FOR PROCESSING MATRIX TRANSFORMATION OPERATIONS

[75] Inventors: Curtis Priem, Fremont; Chris Malachowsky, Santa Clara, both of Calif.

[73] Assignee: Sun Microsystems, Inc., Mountain View, Calif.

[21] Appl. No.: 407,549

[22] Filed: Sep. 15, 1989

[51] Int. Cl.$^5$ .............................................. G06F 7/38
[52] U.S. Cl. ..................................................... 364/748
[58] Field of Search ... 364/748, 736, 746, 200 MS File, 364/715.04; 375/58

[56] References Cited

U.S. PATENT DOCUMENTS 4,811,268  3/1989  Nishitani et al. .................... 364/736
4,860,317  8/1989  Tomlinson ........................ 364/746 X
4,864,527  9/1989  Peng et al. ........................... 364/748

Primary Examiner—Dale M. Shaw
Assistant Examiner—Long T. Nguyen
Attorney, Agent, or Firm—Blakely Sokoloff Taylor & Zafman

[57] ABSTRACT

A matrix arithmetic circuit for processing matrix transformation operations includes a random access memory (RAM) for storing a plurality of numbers in Modulo 256 with multiple tap points numbers format. A multiplier multiplies two of the Modulo 256 numbers in RAM to obtain a product. The product is normalized and added to a third Modulo 256 number stored in the RAM to obtain a result. The result is stored in the RAM and coupled to the data processing system for use in matrix transformation operations.

6 Claims, 4 Drawing Sheets 4,956,801

MATRIX ARITHMETIC CIRCUIT FOR PROCESSING MATRIX TRANSFORMATION OPERATIONS

BACKGROUND OF THE INVENTION

1. Field of the Invention

This invention relates to computer systems and, more particularly, to arrangements for manipulating numbers in a unique number format used in a matrix arithmetic section of an extremely fast graphics accelerator.

2. History of the Prior Art

In designing computer systems the emphasis is constantly on making such systems faster so that they may do more work. Computers with graphics displays are able to do more work than are computers which present only numbers and text material. Unfortunately, the presentation of graphics by a computer requires a great deal of the processing power of that system. For example, the presentation of a single frame of graphical material on the output display of a fairly standard-sized workstation requires that information regarding approximately one thousand pixels in a horizontal direction and approximately one thousand pixels in a vertical direction be stored, approximately one million pixels for each frame to be displayed. In a color system, each of those pixels contains eight or more bits of digital information defining each pixel. Consequently, approximately eight million bits of information needs to be handled and stored for each frame to be presented on the output display. Since frames are repeated thirty times a second on the output display, the total amount of information required to be presented at the output display simply to cause the display itself to operate is a very large number. The simple matter of dealing with such a large amount of information in order to present a graphics output occupies a substantial amount of the time available for a central processing unit (CPU) and may substantially slow the operation of even the fastest of such processors.

For this reason, it has become common for computer systems to include graphics accelerators capable of assisting the central processing unit in its operations by taking over some portion of the data processing function relating to the display of graphics. This offloading of some of the graphics processing functions from the central processing unit to a graphics accelerator can substantially increase the speed with which any particular computer system is able to process graphics information.

Attempts are being made to design very fast graphics accelerators. One of the major functions which may be accomplished by a graphics accelerator is to handle the matrix arithmetic necessary for moving graphics images about on the computer output display. Such matrix operations are necessary in handling both two and three-dimensional graphical figures in order to rotate, translate, scale, and otherwise manipulate the particular graphics figures to be displayed on the computer output display. A graphics accelerator can be very useful in accomplishing these operations because it can relieve the central processing unit of the need to serially recompute various vertices of the figures to be manipulated with each manipulation of the figure to be displayed. A graphics accelerator may accomplish the many operations necessary by means of hardware manipulation of the data and greatly speed the operation of the computer system using such a system.

However, a major problem still remains in obtaining extremely rapid operations. This problem derives from the need of a graphics accelerator to manipulate data in a plurality of different number formats. For example, information handled by a central processing unit normally appears in an integer format and must appear in that format when utilized by an output display because a display does not deal in fractions of pixels. On the other hand, many manipulations with very large numbers used in scientific processing require the use of a floating point format. Such numbers must be dealt with in presenting graphics for such scientific projects. It is clear that such floating point type numbers must ultimately be translated into the integer format for presentation on a computer output display. Additionally, other formats such as that described by the acronym FRACT may be especially useful in manipulating a particular type of graphics display. All of such formats are different, and in prior art systems numbers must be constantly translated between one and another format.

In prior art computer systems, the central processing unit (CPU) has been called upon to accomplish most number translations. Thus, although a floating point number may be processed by use of a floating point co-processor, it must ultimately be converted by a processor of the system into integer format so that it may be used in displaying a particular graphical output on a computer output display. The translation of numbers between different number formats by a processor is handled serially, is very time consuming, and substantially slows the operation of any computer system.

To speed the operation of a graphics accelerator, a new number format has been devised for internal use by matrix transformation circuitry. Copending U.S. patent application Ser. No. 07/407,928, entitled NUMBER CONVERSION APPARATUS, Priem and Malachowsky, filed on even date herewith, describeds a circuit for translating numbers in integer, floating point, and FRACT formats to and from numbers stated in this new format (called Modulo 256 with multiple tap points number format, hereinafter "Modulo 256"). There is still required, however, the unique circuitry and processes for handling the matrix transformation operations in the Modulo 256 number format in which all internal manipulation may be accomplished.

SUMMARY OF THE INVENTION

It is, therefore, an object of the present invention to accelerate the operation of a computer system by providing arangements for rapidly handling the matrix transformation operations for numbers stated in the Modulo 256 with multiple tap points number format.

This and other objects of the present invention are accomplished by a matrix arithmetic circuit comprising means for storing numbers in Modulo 256 with nultiple tap points number format, means for multiplying two numbers stored in Modulo 256 with multiple tap points number format, means for normalizing the result of multiplying the two numbers, and means for adding the normalized result of multiplying the two numbers and a second number in Modulo 256 with multiple tap points number format.

These and other objects and features of the invention will become apparent to those skilled in the art by reference to the following detailed description taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
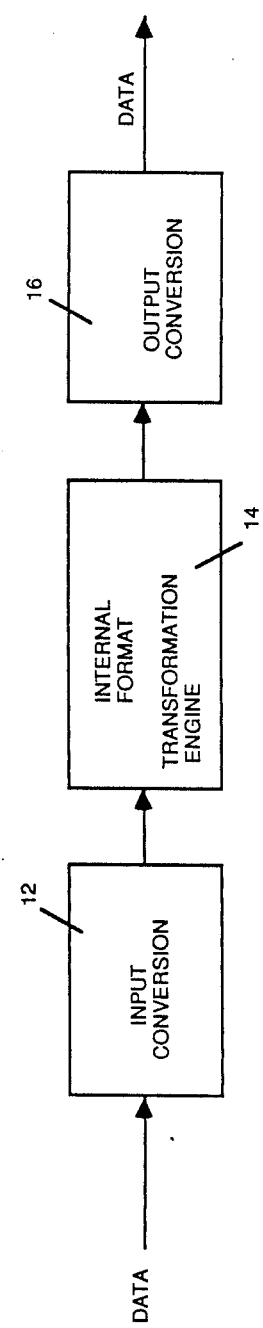
FIG. 1 is an illustration of a matrix transformation system.

FIG. 1 illustrates in block diagram form the basic arrangement of the circuitry of the present invention. As is illustrated in FIG. 1, a data bus provides input signals representing integers, FRACT, and floating point format numbers to an input conversion unit 12. It will, of course, be understood that other number formats which might be utilized in computer systems might be translated to the Modulo 256 format. In the system in which the present invention is utilized, integers are directed to an address so that they may be handled by the input conversion unit 12 with the knowledge that they are in that format. In like manner, numbers appearing in the FRACT and floating point input formats, respectively, are addressed to addresses so that they are recognized by the input conversion unit 12 as appearing in these formats. Consequently, the numbers in each format are converted and normalized in the manner described in the co-pending patent application for each of those formats.

The numbers presented to the input conversion unit 12 are translated into the Modulo 256 format and transferred to the transformation engine 14 of the graphics accelerator. The transformation engine 14 manipulates the numbers in accordance with the teachings of this invention by means of circuitry adapted to handle the unique number format and provides output to an output conversion unit 16. The output conversion unit 16 translates numbers from the Modulo 256 format to each of the integer, FRACT, and floating point formats for further use by the system. For example, the integer format is the format in which numbers must be utilized for storage in the output frame buffer. On the other hand, the FRACT format, the floating point format, and the internal Modulo 256 format may be utilized by the computer system for further operations by that system which do not relate to storage in the frame buffer.

Figure 2:
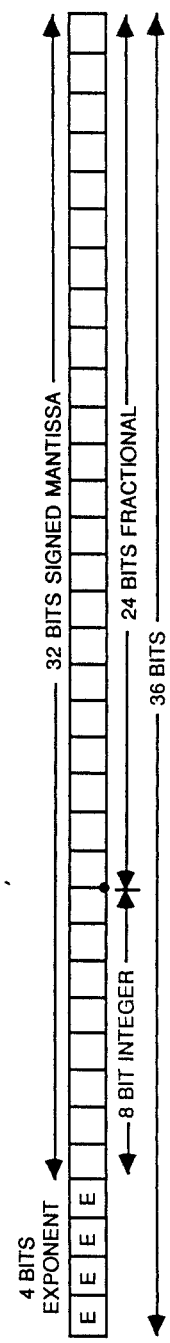
FIG. 2 is an illustration of the Modulo 256 with multiple tap points number format used internally by the matrix transformation circuitry of the present invention.

FIG. 2 illustrates the Modulo 256 with multiple tap points number format utilized by the present invention. The format provides thirty-six individual bit positions. The leftmost four bits are utilized to represent an exponent. The next eight bits are utilized to represent a signed integer component, and the rightmost twenty-four bits are utilized to represent a fractional component. While the bits of the integer portion represent positive powers of two beginning at $2^0$ and increasing to the left from the binary point, the bits of the fractional portion represent negative powers of two beginning with $2^{-1}$ and increasing in negative power to the right from the point. This number format is binary but is used somewhat differently than any of the other number formats usually used by computer systems.

To read a number represented in the Modulo 256 format, the signed mantissa is multiplied by 256 raised to the decimal power indicated by the four bits of the exponent minus eight (the one in the high order bit of the exponent). The high order bit of the exponent is normally a one to allow the easy translation to and from the IEEE format where a one is used to represent numbers larger than can be represented in the given number of bits; the one in the high order bit of the Modulo 256 format allows a more ready translation to and from the IEEE format. The need for a one in the high bit position requires that eight be subtracted to reach the correct exponent value, however.

For example, considering a binary number residing in the mantissa with the binary point in the position illustrated in FIG. 2. If the four exponent bits are 1000, the binary point remains in its initial position as shown in FIG. 2., eight bits to the right of the least significant exponent bit. If the exponent bits are 1001 indicating an exponent of one, the binary point is effectively moved eight bits to the right of the position shown in FIG. 2. If the exponent is 1010 indicating an exponent of two, the binary point effectively shifts sixteen bits to the right of the position illustrated in FIG. 2. An exponent of 1011, three, effectively shifts the binary point twenty-four bits to the right of the position illustrated in FIG. 2 immediately to the right of the lowest order bit position.

It will be recognized by those skilled in the art that a process capable of manipulating numbers in the IEEE single precision format will be incapable of manipulating numbers in another number format such as the Modulo 256 format. Consequently, it is the purpose of this invention to provide apparatus and processes which may be used to manipulate numbers stated in the Modulo 256 number format to accomplish the transformations required of a transformation engine such as scaling, rotating, and translating. The arrangements described herein allow the Modulo 256 number format to be utilized internally by the transformation engine 14 of the graphics accelerator for accomplishing all of the matrix arithmetic operations. Outputs of numbers utilizing this new number format are conveniently provided in each of the other number formats used by the system once manipulations by the transformation engine have been accomplished.

Figure 3:
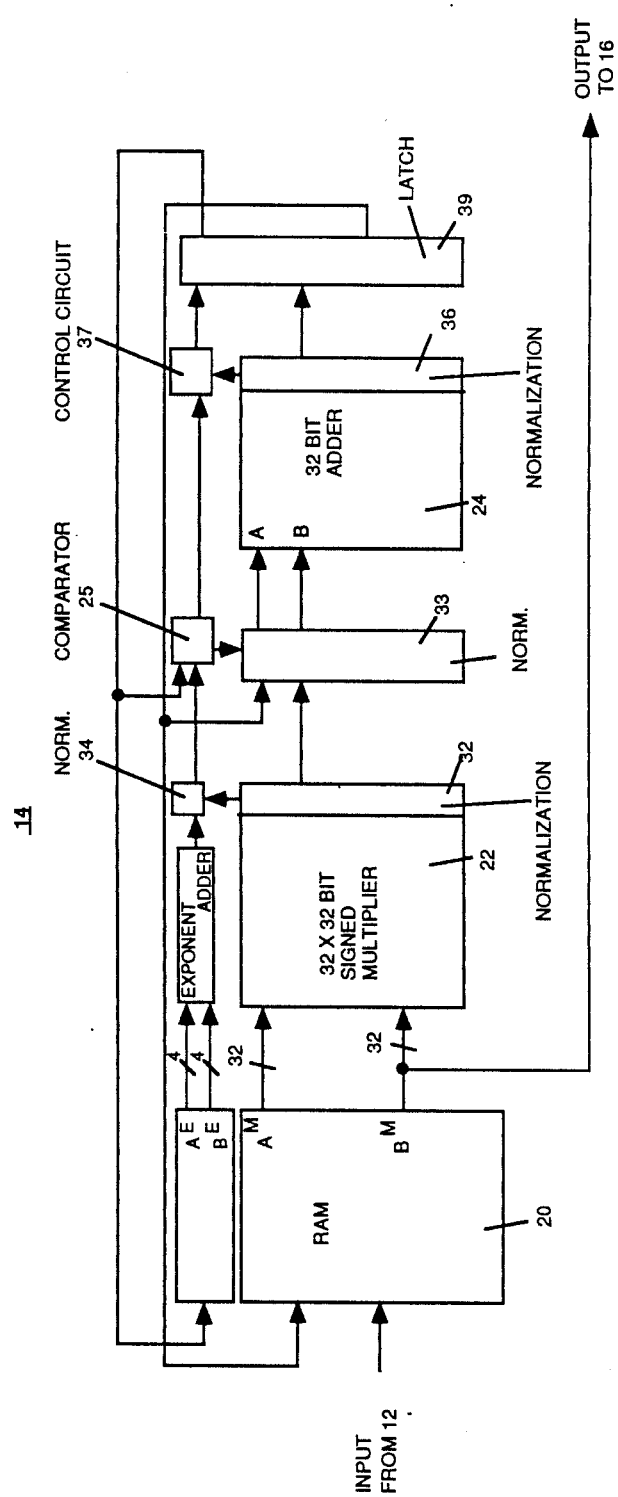
FIG. 3 is a block diagram illustrating the circuitry of the matrix transformation engine of the present invention.

FIG. 3 illustrates in block diagram form the basic arrangement of the circuitry of the present invention. FIG. 3 represents a transformation engine 14 which may be utilized in the present invention for accomplishing the particular matrix functions necessary to a graphics accelerator. The transformation engine 14 includes a random access memory (RAM) 20 which stores in the Modulo 256 format the various numbers received from the central processing unit or other processing unit.

The transformation operations accomplished by a transformation engine are essentially multiplication and addition operations. When multiplication operations are done in any format, it is necessary to multiply the mantissas and add the exponents. When two numbers are added, on the other hand, the exponents must be of the same level. The RAM 20 provides thirty-two bit output signals each representing the mantissa of a Modulo 256 number at each of terminals $A^M$ and $B^M$ and four bit output signals each representing the exponent of a Modulo 256 number at each of terminals $A^E$ and $B^E$ of an exponent storage device 40. The signals on terminals $A^M$ and $B^M$ are transferred to a thirty-two by thirty-two bit signed multiplier 22. The signals on terminals $A^E$ and $B^E$ are transferred to an exponent adder 23. The exponent adder 23 adds the exponents provided at each of terminals $A^E$ and $B^E$. The signed multiplier 22 may be constructed to provide matrix multiplication in a manner well known in the art. In a preferred embodiment of the invention, a thirty-two by thirty-two bit signed multiplier, part number DMB 2440A, manufactured by LSI Logic is utilized. The signed multiplier 22 provides a single sixty-four bit output signal. This signal is normalized by a normalizing circuit 32. The sixty-four bit number is normalized after each multiplication to better fit the bits into the space provided by the Modulo 256 format by moving it as far left as possible in eight bit steps and reducing the exponent by one for each such eight bit step. The normalization circuit 32 provides a signal to an exponent normalizer circuit 34 which adds or subtracts any normalizing changes to the result furnished by the exponent adder circuit 23 to indicate the number of eight bit shifts which have taken place in the normalization process.

The output of the exponent normalizing circuit 34 is provided to an exponent control circuit 25. The output of the normalizing circuit 32 is transferred to a second normalizing circuit 33 and then to a thirty-two bit adder 24. The addition of two number requires that their exponents be of the same value. The exponent control circuit 25 and the normalizing circuit 33 provide this result.

The circuit 25 compares the exponents of the two numbers at its input, determines which has the smaller exponent, and causes the normalizing circuit 33 to shift the mantissa of that smaller number right in eight bit steps until the exponents are of the same value. The two numbers are transferred to the adder 24 and added together. The output of the adder 24 is transferred to another normalizing circuit 36 which functions like the circuit 32 to transfer the result to fit the space provided by the Modulo 256 format. In most cases no action is required after the adder 24. However, in the case of a carry in the high bit, the number has to be shifted right by eight bits to fit into the space provided for the integer portion and the exponent raised by one. The normalizing circuit 36 causes an exponent control circuit 37 to change the value of the exponent. The mantissa and exponent are then furnished to a latching register 39 from which they may be fed back to the random access memory 20 and the thirty-two bit adder 24 to assist in accomplishing the various matrix additions necessary to the transformation engine 14. The adder utilized in the preferred embodiment of the invention is disclosed in U.S. patent application Ser. No. 07/284,110, entitled METHOD AND APPARATUS FOR A PARALLEL CARRY GENERATION ADDER, Priem, filed DEC. 14, 1988.

The number format utilized in the circuitry of the present invention allows processing by a graphics accelerator to take place at an extremely rapid rate. First, the present invention allows additions and multiplications to be conducted simultaneously thereby reducing the time required to accomplish these multiple actions in sequential software by the CPU. For example, it has been determined that operations on floating point numbers furnished to the graphics accelerator of the present invention are accomplished slightly more rapidly than the same operations would be accomplished by a floating point coprocessor such as the many disclosed in the prior art.

Figure 4:
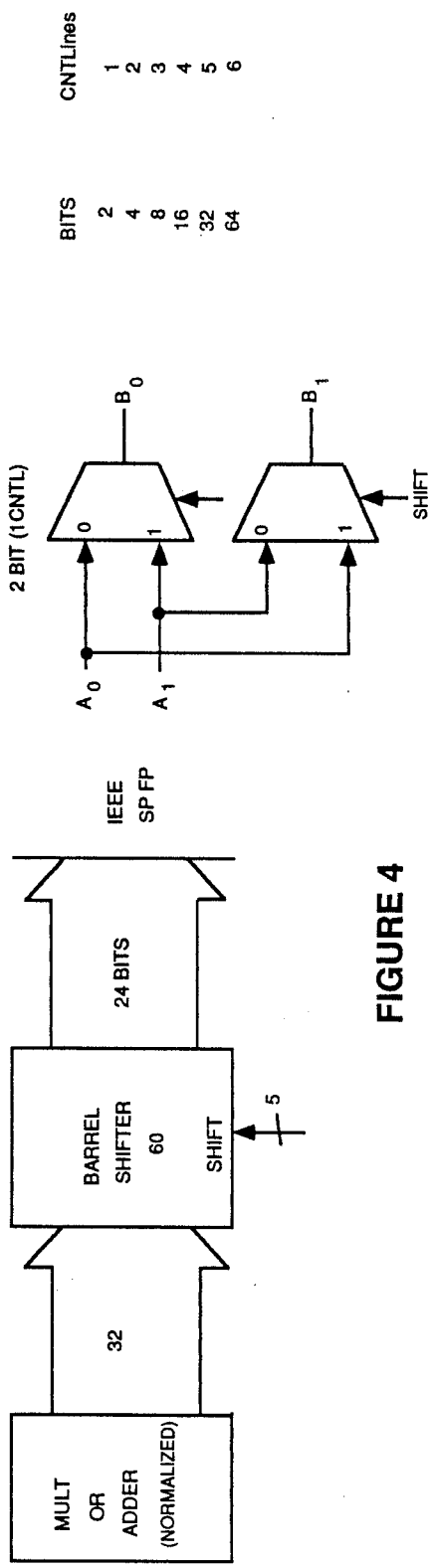
FIG. 4 is a block diagram illustrating the use of a barrel shifter.

One substantial saving in processing time provided using the internal Modulo 256 format is due to the normalization requirement at each of the multiplier 22 and adder 24 stages. In normalizing, whether in IEEE format or in Modulo 256 format, the binary point of the number is shifted a predetermined number of bits to line it with the number format, usually by a barrel shifter. A barrel shifter 60 (see FIG. 4) is a hardware implementation which allows numbers to be shifted by a selected number of bits at once. A barrel shifter 60 is constructed of a number of stages of multiplexors and has a number of control lines equal to the bits necessary to express in binary format the maximum number of bits to be shifted. To shift a number in IEEE single precision floating point format by thirty-two bits requires five control lines; and as a result, five stages of delay are incurred. To shift by steps of eight bits requires only three control lines and results in only three stages of delay. A number in Modulo 256 format can be controlled by two control lines since each shift moves the binary point by eight bit positions. This translates into a savings of three delays for each normalization using the Modulo 256 format instead of single precision floating point format. Since normalization occurs with each multiplication and twice for each addition, substantial time is saved by the arrangement of the present invention.

Another time savings is accomplished by the system of the present invention because it does not use the standard method of processing integer numbers. In most systems, integers or numbers in FRACT format are translated to double precision floating point numbers, the arithmetic is accomplished by the CPU or the floating point co-processor, then they are translated back to integer numbers. This translation is not required in the present invention for all numbers are handled in the Modulo 256 format internally which maintains the full precision of integers and numbers in FRACT format.

Another time savings occurs because the addition is done with two's complement numbers and thus can be done with a fast adder. The mantissa in IEEE format is always a positive number and a sign bit. These numbers must first be converted to two's complement, added with a fast adder, and then converted back to a positive number and a sign bit. In the present invention, the IEEE conversion happens only in conversion units 12 and 16, and not on every addition.

Although the present invention has been described in terms of a preferred embodiment, it will be appreciated that various modifications and alterations might be made by those skilled in the art without departing from the spirit and scope of the invention. The invention should therefore be measured in terms of the claims which follow.

We claim:

1. In a data processing system, an improved matrix arithmetic circuit for processing matrix transformation operations, comprising:

random access memory means for receiving and storing a plurality of numbers in Modulo 256 with multiple tap points number format, said plurality of numbers being provided by an input conversion circuit coupled to said data processing system;

multiplier means coupled to said memory means for multiplying first and second of said numbers stored in said memory means in Modulo 256 format, to form a first result, said result including an exponent;

normalization means coupled to said multiplier means for normalizing said first result, said normalization means including shifting means for shifting said first result by eight bit increments as far to the left of the format space available as possible, and means for reducing said exponent of the result by one for each such shift;

adder means coupled to said normalization means for adding said normalized first result to a third number in Modulo 256 with multiple tap points number format to obtain a second result;

register means coupled to said adder means for receiving said second result and coupling said result to said memory means for storage, said second result also coupled to an output conversion circuit coupled to said data processing system.

2. The matrix arithmetic circuit as defined by claim 1, wherein said third number includes an exponent and said adder means comprises a circuit for comparing said exponents from said normalized first result and said third number and equaling means for equaling said exponents by shifting the number having the least exponent to the right in eight bit increments.

3. The matrix arithmetic circuit as defined by claim 1, wherein said equaling means comprises a barrel shifter.

4. The matrix arithmetic circuit as defined by claim 3, further including second normalization means coupled to said adder means for normalizing said second result.

5. The matrix arithmetic circuit as defined by claim 4, wherein said second normalization means includes means for shifting the result by eight bit increments as far to the left of the format space available as possible and reducing the exponent of said second result by one of each shift.

6. A matrix arithmetic circuit as claimed in claim 1 in which the means for shifting the result by eight bit increments as far to the left of the format space available as possible comprises a barrel shifter.

* * * * *

UNITED STATES PATENT AND TRADEMARK OFFICE
CERTIFICATE OF CORRECTION

PATENT NO. : 4,956,801
DATED : 09/11/90
INVENTOR(S) : Priem et al.

It is certified that error in the above-identified patent and that said Letters Patent is hereby corrected as shown below:

col. 02, line 39   delete "describeds"   insert --describes--
col. 02, line 57   delete "nultiple"     insert --multiple--

Signed and Sealed this

Nineteenth Day of January, 1993

Attest:

DOUGLAS B. COMER

Attesting Officer  Acting Commissioner of Patents and Trademarks